United States Patent [19]
Ito et al.

[11] Patent Number: 5,661,391
[45] Date of Patent: Aug. 26, 1997

[54] APPARATUS FOR CHARGING A PROPULSION BATTERY OF AN ELECTRICALLY POWERED VEHICLE

[75] Inventors: Makoto Ito; Takashi Hyogo; Yasuharu Odachi; Norimoto Minoshima, all of Kariya, Japan

[73] Assignee: Kabushiki Kaisha Toyoda Jidoshokki Seisakusho, Kariya, Japan

[21] Appl. No.: 493,360

[22] Filed: Jun. 21, 1995

[30] Foreign Application Priority Data

Jun. 23, 1994 [JP] Japan ................................ 6-141926

[51] Int. Cl.⁶ ........................................... H02J 7/00
[52] U.S. Cl. ............................... 320/2; 331/DIG. 2
[58] Field of Search ........................ 320/2; 336/DIG. 2

[56] References Cited

U.S. PATENT DOCUMENTS

| | | | |
|---|---|---|---|
| 5,216,402 | 6/1993 | Carosa | 336/DIG. 2 |
| 5,264,776 | 11/1993 | Hulsey | 320/2 |
| 5,315,227 | 5/1994 | Pierson et al. | 320/2 |
| 5,341,083 | 8/1994 | Klontz et al. | 320/2 |
| 5,341,280 | 8/1994 | Divan et al. | 320/2 |
| 5,434,493 | 7/1995 | Woody et al. | 320/2 |
| 5,461,299 | 10/1995 | Bruni | 320/2 |
| 5,462,439 | 10/1995 | Keith | 320/2 |

*Primary Examiner*—Peter S. Wong
*Assistant Examiner*—K. Shin
*Attorney, Agent, or Firm*—Brooks Haidt Haffner & Delahunty

[57] ABSTRACT

An apparatus for charging a battery of an electrically powered vehicle located at a charging station is provided. The apparatus comprises a pair of separate primary cores each of which has a primary coil and is disposed in a wheel stop block secured at the battery charging station, and a secondary coil which is carried by the vehicle. The apparatus further includes a first drive mechanism for retractably lowering the secondary coil linearly to its operative positions, and a second drive mechanism for retractably moving the primary cores inwardly toward each other linearly to their operative position where a closed magnetic circuit is formed thereby and the primary coil is inductively coupled with the secondary coil which is then placed in its operative position. Each primary core has a projection which is engageable with a counterpart of the other core, and the engaged projections of the cores are arranged to pass through an opening of a secondary coil case round which opening the secondary coil is wound.

2 Claims, 9 Drawing Sheets

APPARATUS FOR CHARGING A PROPULSION BATTERY OF AN ELECTRICALLY POWERED VEHICLE

BACKGROUND OF THE INVENTION

The present invention relates to an inductive coupler which is operable by electromagnetic induction to transfer electrical power for charging a propulsion battery of an electrically powered vehicle. More specifically, it relates to a battery charging apparatus which can compensate for slight positioning error of the vehicle with respect to primary charging equipment at a ground charging station.

A battery charging system is known in the art which includes an inductive coupler configured in the form of a transformer mechanism and operable to transfer electrical energy for charging a battery of an electric vehicle from a primary charging equipment disposed within or on the floor of a ground battery charging station.

For example, Publication of Unexamined Japanese Patent Application No. 63-87136 (1988) discloses an apparatus comprising a secondary core and coil assembly disposed on the bottom of an electrical vehicle and a primary core and coil assembly located on the floor of a battery charging station, wherein the vehicle is driven carefully to locate the primary assembly correctly with respect to the primary assembly on the floor so that the primary and secondary assemblies are engaged appropriately or inductively coupled.

With the above apparatus, however, it has been found difficult to position the secondary assembly as desired relative to the stationary primary assembly, with the primary and secondary cores engaged or mated with only a small gap formed therebetween. It is known in the art that the presence of a core-to-core gap causes inductance leakage affecting the electromagnetic induction efficiency and hence efficient battery charging operation. With the above apparatus, therefore, poor efficiency in battery charging was inevitable.

SUMMARY OF THE INVENTION

The present invention was made in view of the above problems. It is the first object of the invention, therefore, to provide a battery charging apparatus which can minimize the inductance leakage during battery charging operation thereby to improve the electromagnetic induction efficiency, even if the vehicle is not located precisely with respect to a reference position defined by the primary charging equipment.

The second object of the invention is to provide a battery charging apparatus which can permit ease of location of the vehicle when charging its battery.

The third object of the invention is to provide a battery charging apparatus which is simple in construction while achieving the above objects.

According to the present invention, a vehicle carrying a battery which needs to be recharged is stopped and located by wheel stop means disposed at a stationary ground battery charging station.

The apparatus of the invention comprises a primary power device disposed at the charging station and including primary core means having a primary coil wound thereround, a secondary power device disposed in the vehicle and including secondary coil means, first drive means for moving the secondary coil means along a first linear path between the retracted inoperative position and the operative position, and second drive means for moving the primary core means along a second linear path, other than the first path, between the retracted inoperative position and the operative position where a closed magnetic circuit is formed by the primary core means and the primary coil of the primary core means is inductively coupled with the secondary coil means which is then placed in the operative position thereof.

The first drive means is operable to effect downward movement of the secondary coil means in a vertical direction along the first linear path, while the second drive means is operable to effect movement of the primary cores means in a horizontal direction that is substantially perpendicular to the above vertical direction and also to the longitudinal direction of the vehicle. The primary core means includes a pair of separate primary magnetic cores and, therefore, such paired primary cores are moved by the second drive means toward and away from each other along the second path, and the operative position of the primary core means is accomplished when its magnetic cores are mated by their closing or inward movement. To effect the inductive coupling for battery charging in the apparatus of the invention, the secondary coil means moved to its operative lowered position is located just between the paired primary cores in their inoperative opened position so that the primary coil and the secondary coil means are inductively coupled when the primary cores are closed to form a closed magnetic circuit.

Each of the primary cores has an E-shape in cross section, including a base portion, two lateral portions extending inwardly from the opposite edges of the core base portion and a central portion extending from the base portion center in the same direction and having the primary coil wound thereround. The secondary coil means has an opening formed therethrough in the direction of the second path. In the inductively coupled condition of the apparatus, the paired primary cores are placed in engagement with each other at the distal ends of the extensions thereof with the central extension passing through the secondary coil opening.

Thus, inductive coupling in the apparatus of the invention can be accomplished successfully by use of a simplified drive mechanism providing simple linear movements of the secondary coil means and the primary core means.

The secondary coil opening is preferably rectangularly shaped, with the dimension of the opening as measured along the longitudinal direction of said vehicle being at least 1.5 times the dimension of the central extending portion of the primary core as measured along said longitudinal direction of the vehicle. Likewise, the dimension of the secondary coil opening as measured vertically is at least 1.5 times the vertical dimension of the central extending portion of the primary core. Such sizing of the secondary coil opening can offer extended allowance for the central extending portion of the primary core to be received safely through the opening.

The apparatus of the invention further comprises the aforementioned wheel stop means for locating the vehicle at the charging station by contact with wheels of the vehicle, wherein the primary power device is disposed in the stop means. The provision of such stop means helps to position the secondary coils means carried by the vehicle properly with respect to the primary core means.

The apparatus of the invention further comprises control means for controlling the operation of the primary power device, secondary power device, first drive means and second drive means for effecting the operation of these drive means and the battery charging operation in properly timed relation, as will be readily understood from the relevant detailed description provided hereinafter.

The above and other objects and features of the invention will be apparent from the following detailed description of preferred embodiments thereof in conjunction with the accompanying drawings.

DETAILED DESCRIPTION OF PREFERRED EMBODIMENTS

Figure 1:
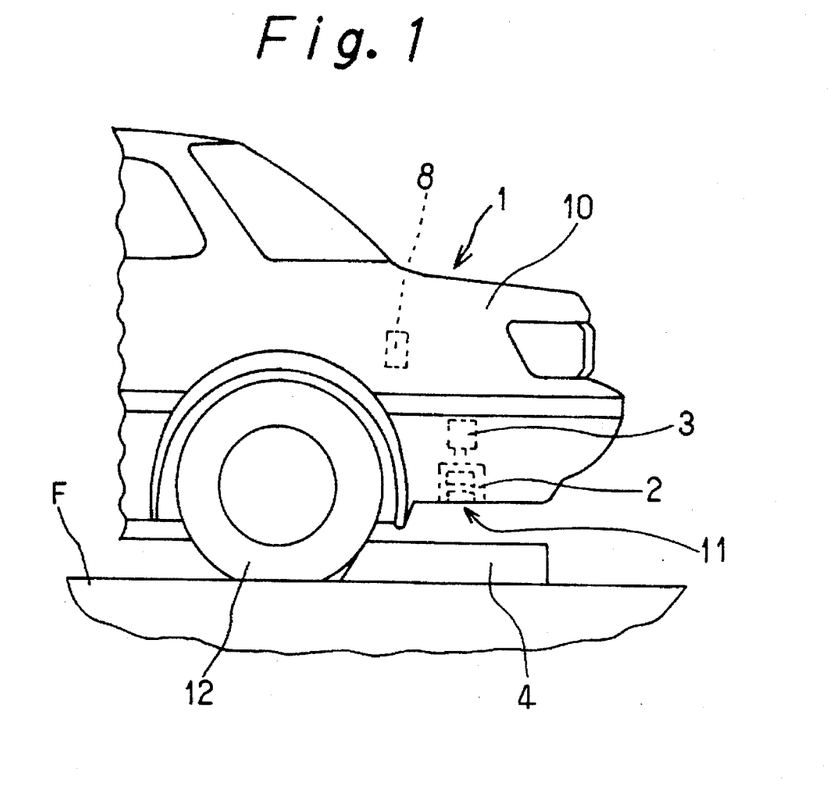
FIG. 1 is a schematic view showing a rear part of an electrically powered vehicle having therein a secondary coil connected to a battery of the vehicle, and parked on a floor at a battery charging station equipped with primary core assemblies.
Figure 2:
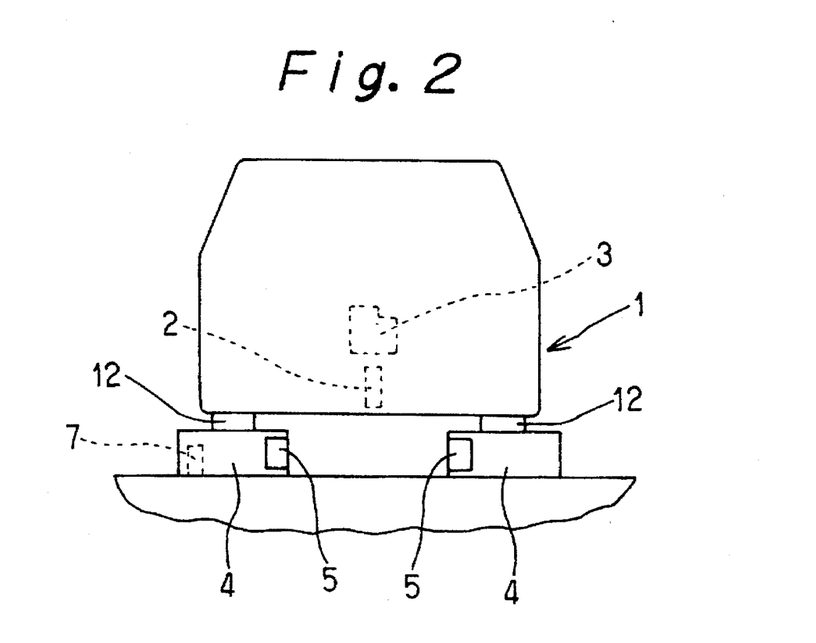
FIG. 2 is a schematic rear view of the vehicle and the battery charging station of FIG. 1.
Figure 4:
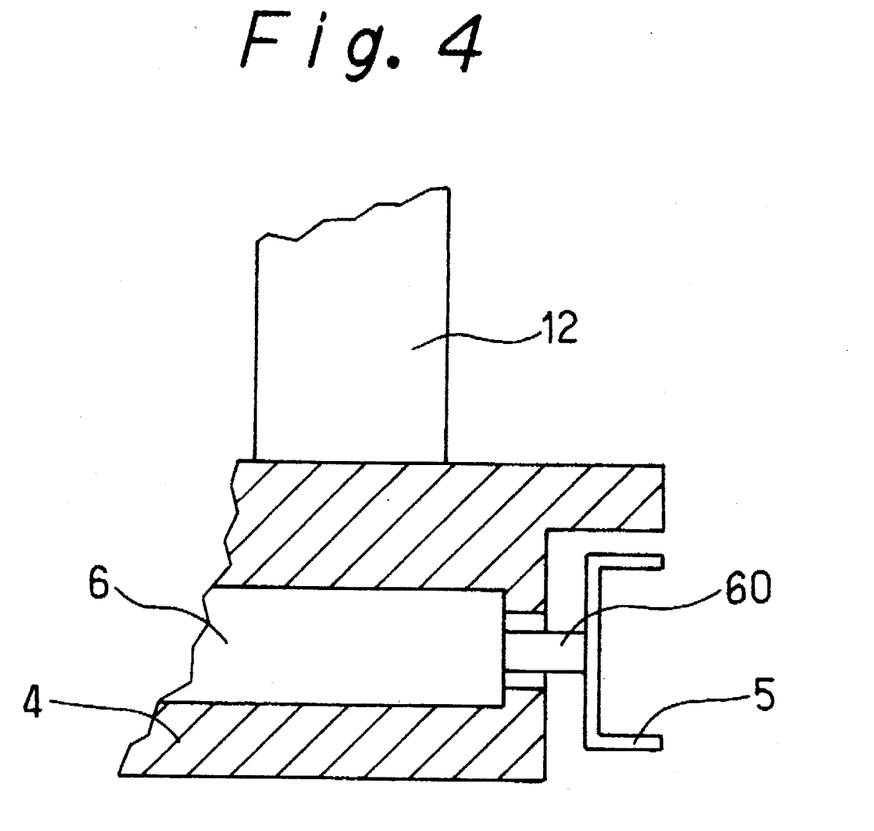
FIG. 4 is a detailed fragmentary view showing one of the primary core assemblies and its drive mechanism.

Firstly referring to FIGS. 1 and 2, there is shown an electrically powered vehicle 1 which is positioned or parked at a battery charging station with its two rear wheels 12 stopped in contact with a pair of wheel stop blocks 4 secured to floor F of the charging station. The vehicle 1 carries at the bottom of its trunk 10 a secondary coil 2 electrically connected to a battery (designated by reference symbol B in FIG. 5), and an actuator 3 for moving the secondary coil linearly between the retracted position (shown in FIG. 2) and the lowered operative charging position through an opening 11 formed at bottom of the trunk. The actuator 3 may be of any type, but the one in the illustrated embodiment is of a type that is driven by a motor (designated by reference numeral 30 in FIG. 5) and operable to retractably extend a rod (not shown) connected between the actuator and the secondary coil 2. Each of the stop blocks 4 has a primary core assembly 5 disposed in facing relation to the counterpart assembly in the other stop block. As shown in FIG. 4, each stop block 4 has incorporated therein a motor-driven actuator 6 connected to the associated primary core assembly 5 through a rod 60 so that the primary core assembly is movable by operation of the actuator between the retracted position (shown in FIG. 4) and the operative position where the primary core assembly has moved inward as far as it will go. As shown schematically in FIGS. 1 and 5, the vehicle 1 has a control device 8 and one stop block 4 has a control device 7.

Figure 3:
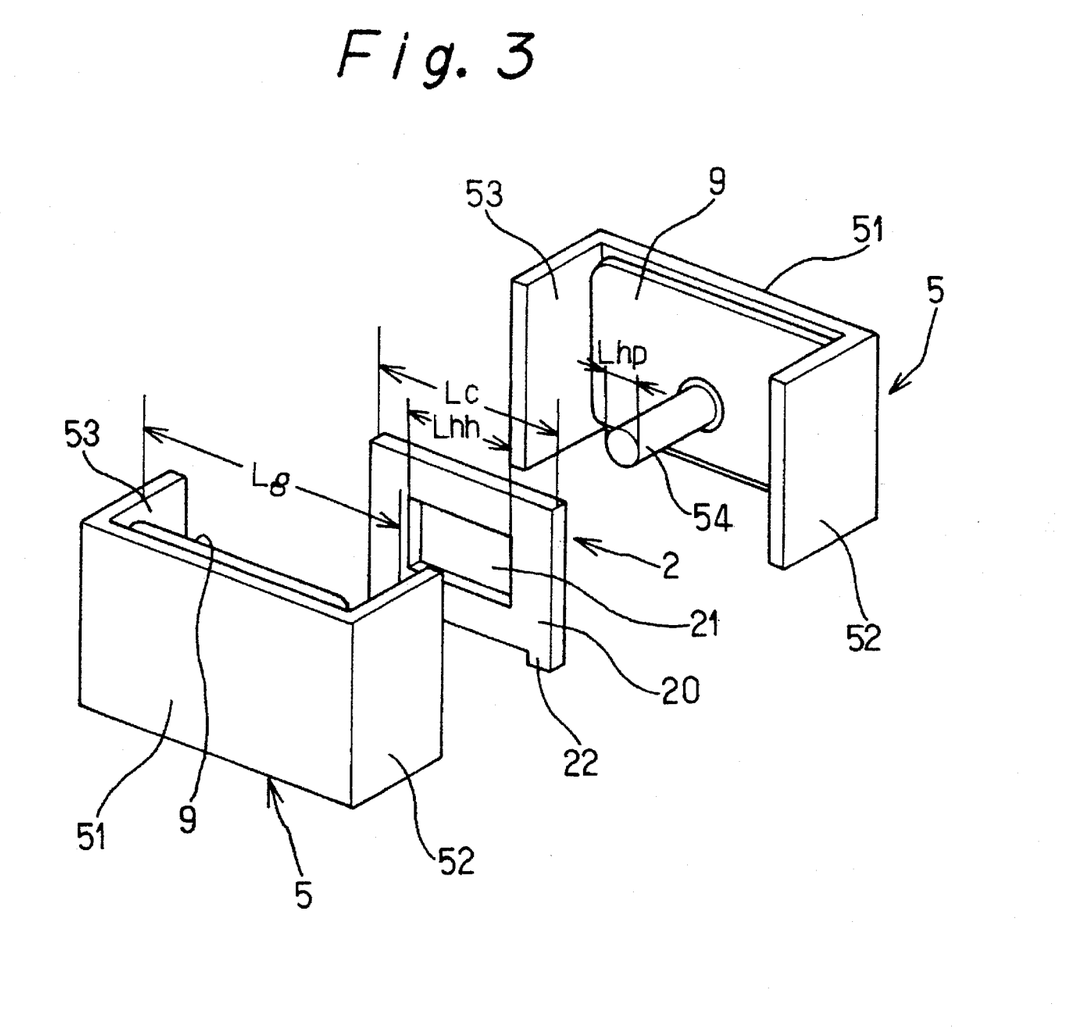
FIG. 3 is a perspective view showing the secondary coil of FIG. 1 in its operative position and a pair of primary core assemblies in their inoperative position, respectively.
Figure 8:
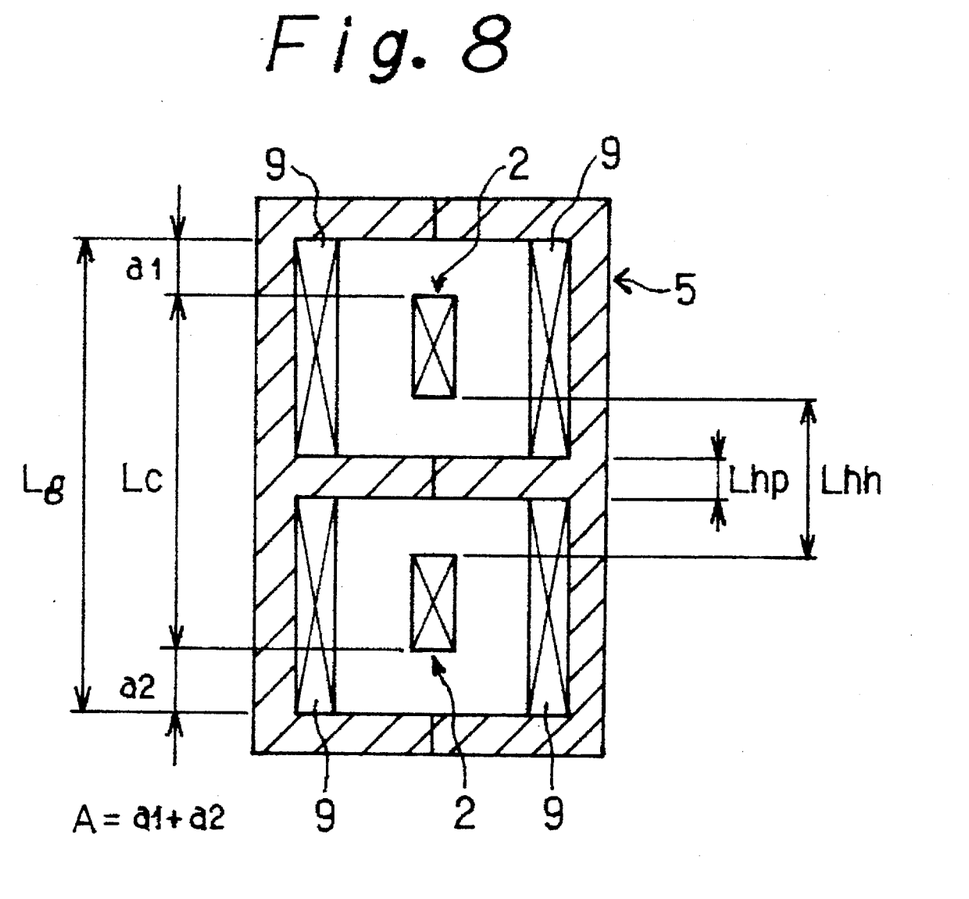
FIG. 8 is a cross-sectional view of the secondary coil and the primary core assemblies in their operative positions, which is provided specifically to illustrate their dimensional relationship.

Referring to FIG. 3 showing the secondary coil 2 placed in its lowered operative position and the primary core assemblies 5 located in their retracted inoperative positions, each primary core assembly includes an E-shaped magnetic core having a base portion 51 and two lateral portions 52, 53 extending inwardly from the opposite edges of the base portion toward similar lateral portions of the other core and a cylindrical central rod portion 54. The core is made of solid ferrite, laminations of thin steel sheets having magnetic properties and insulated from one another, or any other suitable material. Each core assembly 5 further includes a primary coil 9 attached to the inner bottom of the core and wound around the cylindrical rod portion 54 which projects from the core base portion 51 through a center opening defined by the primary coil to the same extent as the lateral portions 52, 53. The secondary coil 2 is enclosed by a resin case 20 having a pair of leg portions 22 projecting downward from the bottom of the case and a rectangular center opening 21. With the primary core assemblies 5 closed or moved inwardly to their operative position, the distal ends of the lateral portions 52, 53 and the rod portion. 54 of one primary core assembly are set in abutment contact with the counterparts of the other core assembly, as shown in FIG. 8, thereby to form a closed magnetic circuit and, therefore, the primary and secondary coils 9 and 2 are inductively coupled to make possible transfer of electrical power by electromagnetic induction from the primary coil 9 to the secondary coil 2 when a high frequency voltage is applied across the primary coil.

Figure 5:
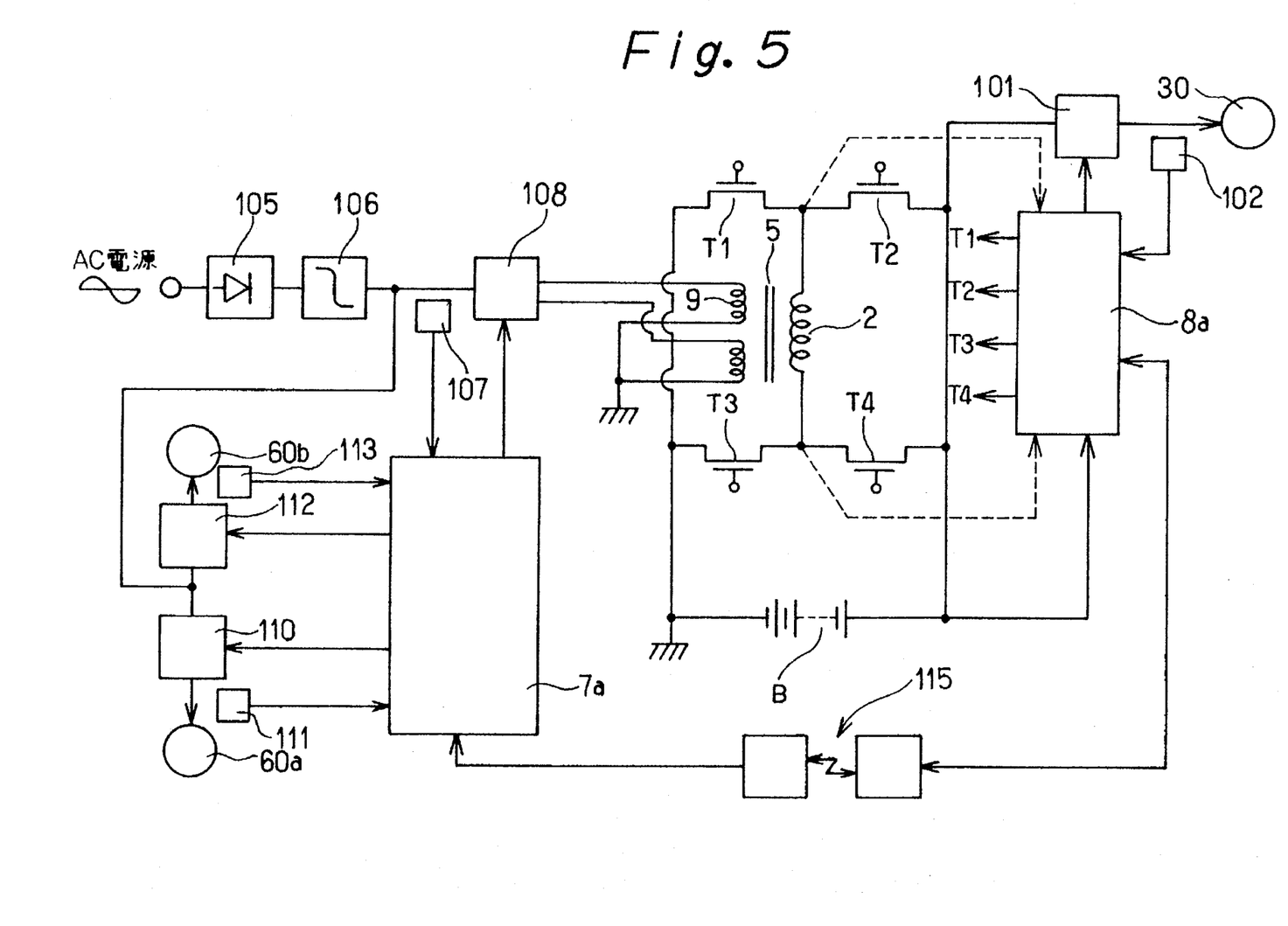
FIG. 5 is a block diagram of an electrical circuit to effect battery charging according to the invention in the parking arrangement as shown in FIGS. 1 and 2.

Referring now to the circuit diagram of FIG. 5, the battery charging apparatus will be described with reference to the control devices 7, 8. It is noted that in the illustrated circuit diagram the primary core assemblies 5 are in closed condition with the paired primary cores placed in contact with each other at the rods 54 and the lateral portions 52, 53 thereof and the rods extending through the center opening 21 of the secondary coil 2, so that the primary and secondary coils 9 and 2 are inductively coupled. As seen from the diagram, the primary coils 9 attached to separate primary cores and hence shown separately in FIGS. 3 and 8 are connected to present a pair of terminals across which a voltage may be applied.

The control device 7 on the primary side comprises a control 7a in the form of a microcomputer, to which an inverter circuit 108 is connected to receive therefrom a control signal. The inverter circuit 108 is connected at the output thereof to the terminals of the primary coils 9 and at the input to a smoothing circuit 106, which is in turn connected to a rectifying circuit 105 connectable at the input thereof with a commercial alternating current power source. It is noted that the inverter circuit 108 also functions as a switch to shut off a current to the primary coils 9. The control device 7 further includes semiconductor switches 110, 112 connected to the control 7a for controlling the operation of motors 60a, 60b which are operatively connected to the actuators 6 for the left and right primary core assemblies 5, respectively. Also connected to the control 7a are current sensor 107, and current sesnors 111, 113 for monitoring a current flowing to the motors 60a, 60b.

On the other hand, the control device 8 on the secondary side of the apparatus comprises a control 8a in the form of a microcomputer, to which an H-shape bridge rectifying circuit including two pairs of transistors T1, T2 and T3, T4 are connected, as indicated by four arrows coming out from the control 8a. The control device 8 further includes a semiconductor switch 101 and a current sensor 102 connected to the control 8a, respectively. The switch 101 is connected to a motor 30 for driving the actuator 3 for the secondary coil 2 and the current sensor 102 is disposed to monitor a current flowing to the motor 30. As indicated at 115, the control 8a is interactively communicable with the control 7a by a wireless communication device operable to transmit and receive ultrasonic signals between the two controls.

The following will describe the operation of the circuit. An alternating current supplied from the power source is rectified and then filtered or smoothed out by the rectifying circuit 105 and the smoothing circuit 106, respectively, so that the input current is converted into a direct current at the output of the smoothing circuit. The current is then converted by the inverter circuit 108 into an alternating current with a given constant high frequency, which is applied across the terminals of the primary coils 9. Thus, a current is produced or induced in the secondary coil 2 by electromagnetic induction. The secondary alternating current appearing across the secondary coil 2 is rectified by two pairs of transistors T1, T2 and T3, T4 in the bridge rectifying circuit into a direct current for charging the battery B of the vehicle 1 connected to the secondary coil 2.

The control 8a constantly monitors a voltage V across the battery and also a potential difference across the secondary coil 2 as indicated by dotted lines in the diagram and controls the operation of the paired transistors T1, T2 and T3, T4, and hence the secondary charging current to the battery B, in accordance with the detected voltage V and the potential difference. To be more specific, the control 8a turns alternately on and off the respective pairs of transistors complementarily for each half-wave of the secondary voltage and, simultaneously, controls the "on" or energized time of each paired transistors in a PWM (pulse width modulation) manner according to the above detected voltage V and the potential difference.

Additionally, the control device 7 may have an alarm buzzer or lamp (not shown) indicating to a vehicle driver or a battery charging station operator that battery charging has been completed.

For the sake of the description in a later part hereof with reference to the flow charts in FIGS. 6 and 7, it is supposed that the motor 60a and its associated switch 110 and current sensor 111 are provided for the core assembly 5 on the left-hand side as viewed in FIG. 2, and the motor 60b and its associated switch 112 and current sensor 113 are for the right-hand side core assembly, respectively.

Figure 6:
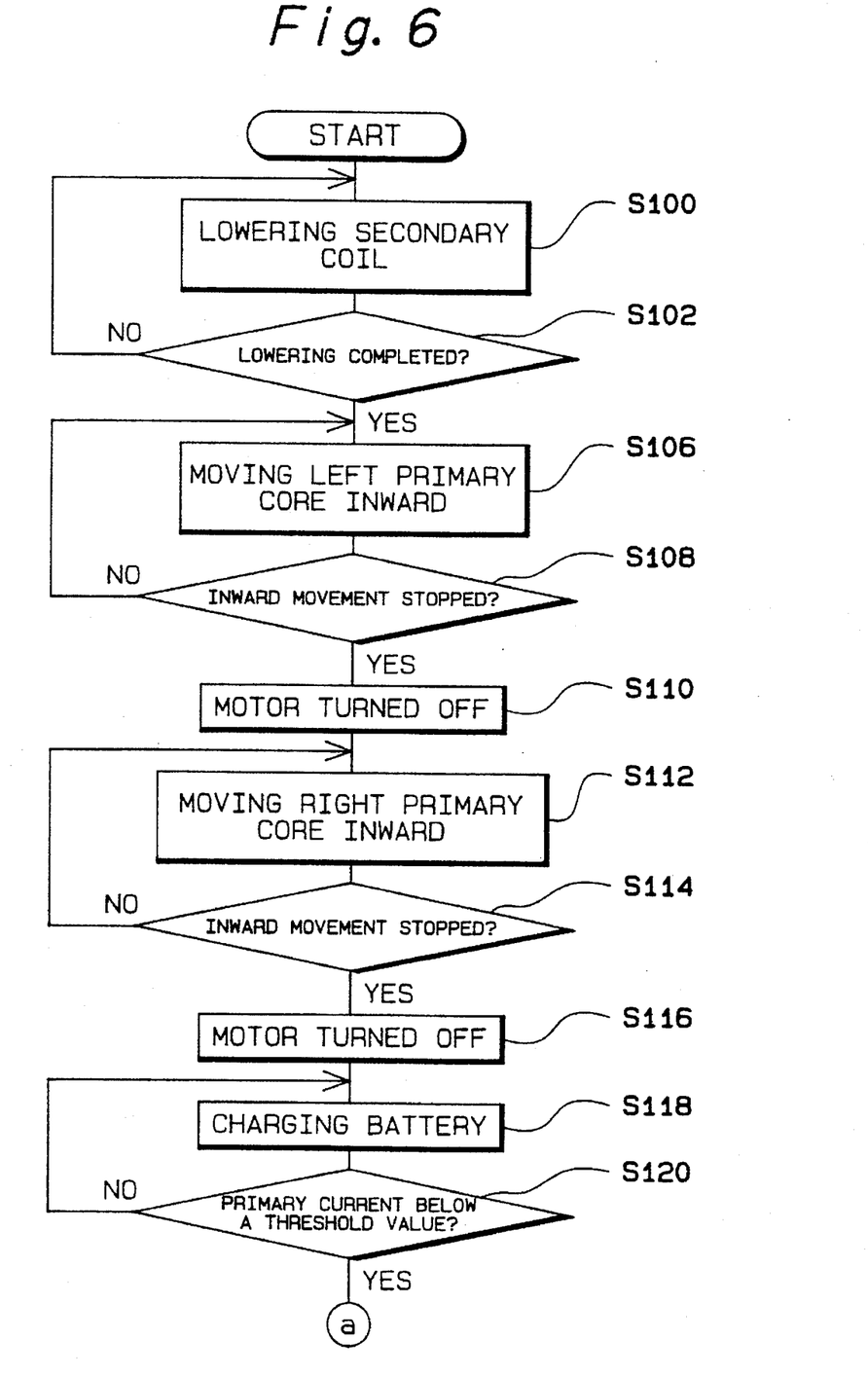
FIG. 6 is a first part of a flow chart illustrating the procedure of operation of the system according to the invention.
Figure 7:
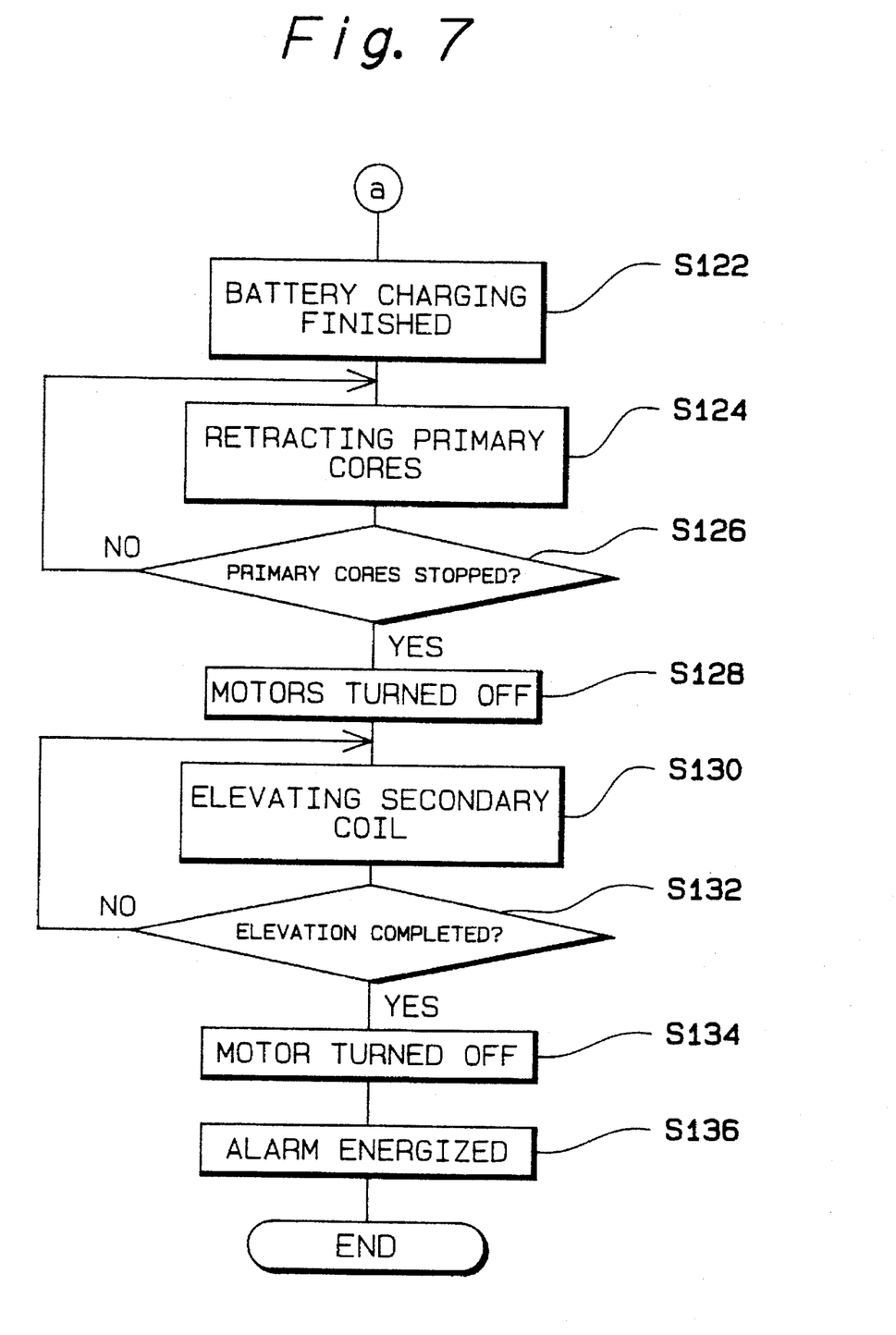
FIG. 7 is a second part of the flow chart of FIG. 6.

The following will explain the procedure of operation of the above-described apparatus with reference to the flow charts shown in FIGS. 6 and 7.

The procedure is started either manually or automatically after the vehicle 1 has been parked with its rear wheels 12 placed in contact with the stop blocks 4 as shown in FIGS. 1 and 2. When the procedure is thus initiated, the control 8a generates to the switch 101 a signal that commands lowering movement of the secondary coil 2. Accordingly, the switch 101 is closed to drive the motor 30 to rotate in a direction that causes the secondary coil 2 to move downward (Step S100). During this downward movement of the secondary coil 2, a current to the motor 30 is monitored by the current sensor 102. As the secondary coil 2 is lowered until the two legs 22 of the coil case 20 are brought into contact with the floor surface F, the motor 30 undergoes an operation with its rotor locked and, therefore, a current to the motor is increased to a lock current level, which is detected by the current sensor 102. Responding to a lock current signal from the current sensor 102, the control 8a opens the switch 101 thereby to stop the motor 30 and, simultaneously, generates to the control 7a through the communication device 115 a signal indicative of the lowering motion of the secondary coil 2 being completed (Step S102).

Upon receiving the signal, the control 7a turns on the switch 110 to activate the motor 60a, thereby energizing the actuator 6 for the left primary core assembly 5. Thus, the associated rod 60 is extended, causing the left primary core assembly 5 to move inward or toward the lowered secondary coil 2 (Step S106). A current flowing to the motor 60a is monitored by the current sensor 111 during this inward movement. When such movement of the left primary core assembly 5 is stopped by contact between the primary coil 9 and the secondary coil 2 and, accordingly, a lock current is detected by the current sensor 111 (Step 108), the control 7a opens the switch 110 thereby to turn off and stop the motor 60a (Step S110). The stop of the motor 60a is followed by closing of the switch 112 to activate the motor 60b, thereby energizing the actuator 6 for the right primary core assemblies 5. Therefore, its associated rod 60 is extended to initiate inward movement of the right primary core assembly 5 toward the secondary coil 2 (Step S112). When the inward movement is stopped by contact between the right and left primary core assemblies and then a lock current to the motor 60b is detected by the current sensor 113 (Step 114), the control 7a opens the switch 112 turning off or stopping the motor 60b (Step 116). Thus, the primary core assemblies 5 are set in closed arrangement to form a closed magnetic circuit.

Subsequently, the control 7a turns on the switch 108 to supply the high-frequency ac current to the primary coils 9 and, simultaneously, generates to the control 8a through the communication device 115 a signal commanding a start of battery charging. Responding to this signal, the control 8a operates to drive the bridge rectifying circuit in synchronism with the alternately changing phase of the voltage across the secondary coil 2 for rectifying an induced ac current into a dc charging current for the battery B (Step S118). During rectifying operation, operation of the transistors T1, T2 and T3, T4 are pulse-width modulated according to the battery voltage V and the potential difference across the secondary coil 2 to control the charging current appropriately.

As the battery voltage V has reached a full-charge level, the transistors T1, T2 and T3, T4 are all turned off and, therefore, the primary current flowing to the primary coils 9 is decreased. When a decrease in this primary current below a given threshold valve is detected by the current sensor 107 (Step S120), the control 7a turns off the switch 108 to shut off the flow of current to the primary coils 9 and battery charging is thus finished (Step S122). Then, the switches 110, 112 are closed to drive the motors 6a, 6b in reverse direction to move the primary core assemblies 5 toward their retracted positions (Step S124). The retracted positions reached by the primary core assemblies 5 are ascertained (Step S126) by the current sensors 111, 113 which then detect lock currents flowing to the motors 60a, 60b when the actuator rods 60 are fully retracted and hence the motors are placed in locked condition. In response to signals then generated by the current sensors 111, 113, the control 7a opens the switches 110, 112 to turn off the motors 60a, 60b (Step S128).

After the primary core assemblies 5 have been thus fully retracted, the control 8a closes the switch 101 to drive the motor 30 to rotate in the direction to elevate the secondary coil 2 (Step S130). If the current sensor 102 detects a lock current flowing to the motor 30 when the secondary coil assembly 2 has been elevated to reach its retracted position (Step S132), the switch 101 is opened to turn off the motor 30 (Step S134). Then, the lamp or buzzer (not shown) is energized to give an alarm to the vehicle driver or battery charging station operator and, simultaneously, completion of the charging operation is reported to the control 7a through the communication device 115 (Step S136).

Figure 9:
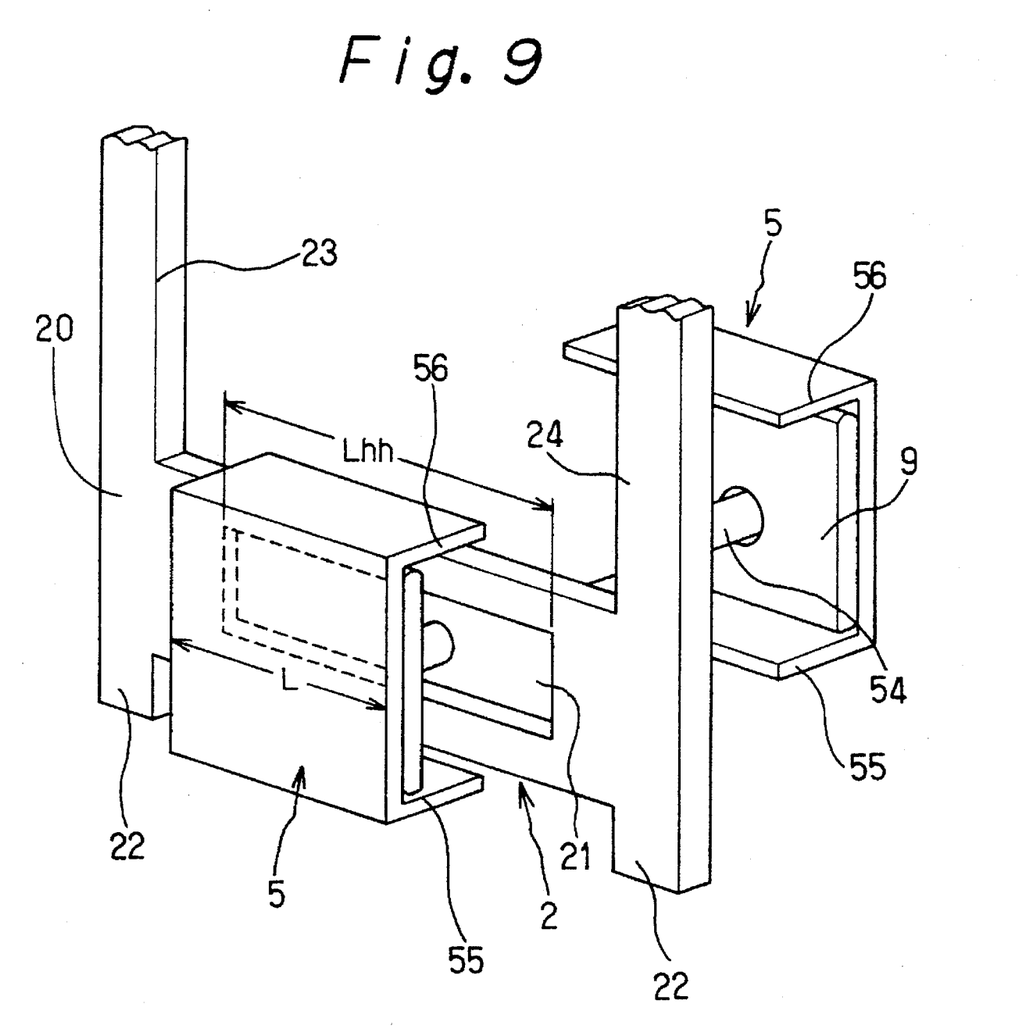
FIG. 9 is schematic perspective view similar to FIG. 3, showing a second embodiment of the battery charging apparatus according to the invention.

Now referring specifically to FIGS. 3 and 8, the following will deal with the dimensional relationship between the secondary coil case 20 and the primary cores of the assemblies 5. In the illustrated embodiment, the height or vertical dimension of the rectangular center opening 21 of the secondary coil case 20 measures at least 1.5 times the vertical dimension or diameter of the cylindrical rod portion 54 of each primary core. Likewise, the width dimension Lhh of the rectangular opening, as measured along the longitudinal direction of the vehicle, is at least 1.5 times the maximum horizontal dimension Lhp of the rod portion 54 as measured along the same longitudinal direction of the vehicle, i.e. the diameter of the rod portion in the illustrated embodiment. Additionally, the spaced dimension Lg between the two lateral portions 52, 53 as measured between the inner surfaces thereof is substantially equivalent to the sum of the width dimension Lc of the secondary coil case 20 and a dimension A, wherein the dimension A is greater than the difference between the dimensions Lhh and Lhp (Lhh−Lhp). As seen from the diagram in FIG. 8, the dimension A is the sum of two spaced dimensions a1 and a2 each measured between the outer face of the secondary coil case 20 and its adjacent inner face of the lateral portion 52 or 53. By so sizing the secondary coil case opening 21, the central rod portion 54 of the primary core can be safely inserted into the center opening 21 without mechanical interference with the case 20 even if the vehicle 1 is not precisely parked with respect to the stop blocks 4. It is noted that the illustration in FIG. 8, wherein the secondary coil 2 is shown located centrally with respect to the closed primary cores, is provided for the sake of convenience of explaining the dimensional relationship and that the secondary coil is positioned in contact with the primary coil 9 of the left-hand side primary core assembly in the embodiment as will be understood from the description in earlier part hereof, A record embodiment of the invention is illustrated in FIG. 9. This differs from the first embodiment in that the lateral core portions 52, 53 of each core assembly 5 in the latter embodiment are replaced with top and bottom portions 56, 55 so that the primary core assembly is open at the lateral sides thereof, thereby permitting the secondary coil case 20 to extend beyond the width dimension L of the primary core. As a result, the width dimension Lhh of the secondary coil case opening 21 can be formed greater than the width dimension L of the primary core. Such extension of the opening 21 can extend the allowance for parking positioning of the vehicle 1 along its longitudinal direction with respect to the primary equipment at the battery charging station. As seen from the drawing, the secondary coil case 20 of the embodiment has a pair of arm portions 23, 24 formed integral with the case and extending upward for connection with actuator rod (not shown).

Figure 10:
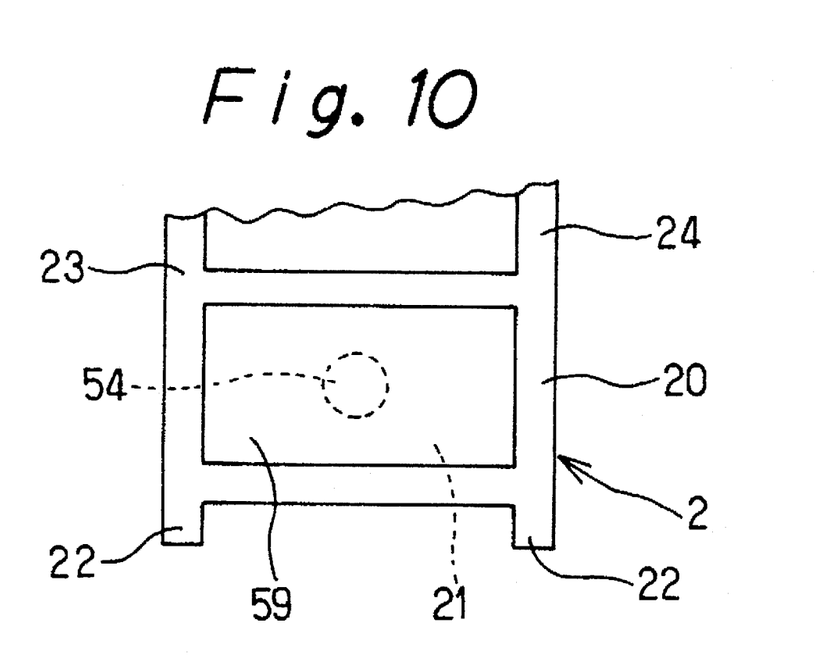
FIG. 10 is a schematic side view showing a modification from the embodiment of FIG. 9.

As a modification from the second embodiment of FIG. 9, the center opening 21 of the secondary coil case 20 may be filled by a secondary core 59, as shown in FIG. 10, which is made of soft magnetic material. In this case, the central rod 54 of the primary core assembly 5 can be shortened. When the primary core assembly 5 and the secondary core 59 are in their operative positions, the distal end of the rod 54 engages the secondary core 59.

What is claimed is:

1. An apparatus for charging a battery of an electrically powered vehicle, stopped at a stationary charging location, by electromagnetic induction, comprising:

a primary power device disposed at said charging location and including primary core means having a primary coil, said primary coil being connectable with a power source;

a secondary power device disposed in said vehicle and including secondary coil means;

first drive means for moving said secondary coil means along a first path between a retracted inoperative position and an operative position thereof;

second drive means for moving said primary core means along a second path other than said first path between a retracted inoperative position and an operative position thereof such that when said secondary coil and said primary core means are each in their operative postions, a closed magnetic circuit is formed by said primary core means, and said primary coil of said primary core means is inductively coupled with said secondary coil means, said first drive means being operable to cause downward movement of said secondary coil means along said first path to said operative position thereof, said primary core means having first and second separate primary cores, said second drive means being operable to cause closing inward movement of said first and second primary cores toward each other along said second path to said operative position of said primary core means, said first and second primary cores each having an β-shape including a base portion having opposite edges and a center, two portions extending from said opposite edges of said base portion and a central portion extending from said center of said base portion, said two portions and said central portion of said first primary core extending towards said two portions and said central portion of said secondary primary core, each of said central portions having a primary coil wound therearound, and each of said central portions having a distal end, and said secondary coil means includes a secondary coil and a secondary core around which said secondary coil is wound, said two portions of said first primary core engaging said two portions of said second primary core and said distal ends of each of said central portions of said first and second primary cores engaging a surface of said secondary core adjacent to said central portion when said secondary coil means and said primary core means are both placed in the operative positions thereof.

2. An apparatus according to claim 1, wherein said first drive means causes said secondary coil means to move linearly in substantially vertical direction and said second drive means causes said first and second primary cores means to move linearly in a direction substantially perpendicular to said vertical direction and also to the longitudinal direction of said vehicle.

* * * * *

UNITED STATES PATENT AND TRADEMARK OFFICE
CERTIFICATE OF CORRECTION

PATENT NO. : 5,661,391
DATED : August 26, 1997
INVENTOR(S) : M. Ito et al.

It is certified that error appears in the above-indentified patent and that said Letters Patent is hereby corrected as shown below:

Col. 4, line 19, before "54" delete the period ".";
line 56, change "sesnors" to --sensors--.

Col. 6, line 25, after "112" insert a comma ",".

Col. 7, line 13, after "opening" and before the comma "," insert --21--;
line 14, after "vehicle" and before the comma "," insert --1--;
line 40, change "record" to --second--.

Col. 8, line 34, change "β-shape" to --E-shape--.

Signed and Sealed this

Sixth Day of October, 1998

Attest:

BRUCE LEHMAN

Attesting Officer

Commissioner of Patents and Trademarks